(12) United States Patent
Dearborn et al.

(10) Patent No.: US 8,922,183 B2
(45) Date of Patent: Dec. 30, 2014

(54) ADAPTIVE INTEGRATED ANALOG CONTROL SYSTEM COMPENSATION

(75) Inventors: Scott Dearborn, Brackney, PA (US); Terry L. Cleveland, Endicott, NY (US); Clifford N. Ellison, III, Campbell, NY (US)

(73) Assignee: Microchip Technology Incorporated, Chandler, AZ (US)

( * ) Notice: Subject to any disclaimer, the term of this patent is extended or adjusted under 35 U.S.C. 154(b) by 194 days.

(21) Appl. No.: 13/325,805

(22) Filed: Dec. 14, 2011

(65) Prior Publication Data
US 2012/0169310 A1  Jul. 5, 2012

Related U.S. Application Data

(60) Provisional application No. 61/427,912, filed on Dec. 29, 2010.

(51) Int. Cl.
*G05F 1/00* (2006.01)
*H02M 3/158* (2006.01)
*H02M 1/00* (2006.01)

(52) U.S. Cl.
CPC .......... *H02M 3/1588* (2013.01); *Y02B 70/1466* (2013.01); *H02M 2001/0025* (2013.01)
USPC ......................................... 323/283; 323/271

(58) Field of Classification Search
CPC ....... H02M 3/06; H02M 3/156; H02M 3/157; H02M 3/158; H02M 3/1588; H02M 2001/0025; H02M 3/155; H02M 2001/003; H02M 2001/0016; H02M 2001/0029; H02M 2003/156; H02M 2003/1566; H02M 2003/158; Y02B 70/1466; G05F 1/10; G05F 1/46; G05F 1/461

USPC ......... 323/282–290, 222–226, 271–275, 351, 323/311, 312, 298; 341/143, 118, 120, 131, 341/126; 327/551–559; 700/298
See application file for complete search history.

(56) References Cited

U.S. PATENT DOCUMENTS

| | | | |
|---|---|---|---|
| 7,023,191 B2 | 4/2006 | Bernacchia et al. | 323/282 |
| 7,221,302 B1 | 5/2007 | Melanson | 341/143 |
| 2007/0232236 A1* | 10/2007 | Kasha et al. | 455/67.14 |
| 2011/0018507 A1* | 1/2011 | McCloy-Stevens et al. | 323/271 |
| 2012/0139519 A1 | 6/2012 | Dearborn | 323/290 |

FOREIGN PATENT DOCUMENTS

DE    10312221 A1    10/2004    ............ G05F 1/40

OTHER PUBLICATIONS

Lee, Kuen-Jong et al., "A Current Mode Testable Design of Operational Transconductance Amplifier—Capacitor Filters," IEEE Transactions on Circuits and Systems—II: Analog and Digital Signal Processing, vol. 46, No. 4, 14 pages, Apr. 1, 1999.
Saggini, S. et al., "A Simple Digital Auto-Tuning for Analog Controller in SMPS," Applied Power Electronics Conference and Exposition, IEEE, 8 pages, Feb. 15, 2009.
Michal, Vratislav et al., "Single Active Element PID Controllers," 20th International Conference Radioelektronika, IEEE, 4 pages, Apr. 19, 2010.
International Search Report and Written Opinion, Application No. PCT/US2011/065815, 12 pages, May 15, 2013.

* cited by examiner

*Primary Examiner* — Timothy J Dole
*Assistant Examiner* — Carlos Rivera-Perez
(74) *Attorney, Agent, or Firm* — King & Spalding L.L.P.

(57) ABSTRACT

An analog closed-loop, negative feedback system that adapts feedback compensation during operation thereof to improve dynamic performance thereof. Using a pure analog control loop with digital assist provides speed and simplicity of an analog control loop with the flexibility of digital control. Adapting the compensation allows the system to accurately predict and adjust, at all DC operating points, (1) the margin of stability of the converter, against closed loop oscillation, and (2) the frequency-domain and time-domain responses to perturbations in the input voltage and/or the output current. Operational transconductance amplifiers (OTAs) and digitally controlled digital-to-analog converters (IDACs) are used to dynamically change the operating parameters of the analog closed-loop of the negative feedback system. The negative feedback system may be a switch mode power supply (SMPS).

20 Claims, 7 Drawing Sheets

ADAPTIVE INTEGRATED ANALOG CONTROL SYSTEM COMPENSATION

RELATED PATENT APPLICATION

This application claims priority to commonly owned U.S. Provisional Patent Application Ser. No. 61/427,912; filed Dec. 29, 2010; entitled "Adaptive Integrated Analog Control System Compensation," by Scott Dearborn, Terry L. Cleveland, and Clifford Ellison III, and is hereby incorporated by reference herein for all purposes.

TECHNICAL FIELD

The present disclosure relates to closed-loop, analog negative feedback systems, and, more particularly, to adapting compensation to the operating conditions of a closed-loop, analog negative feedback system.

BACKGROUND

Closed-loop, analog negative feedback systems are used in many applications, for example, but are not limited to, power conversion systems that connect to an energy source, e.g., a voltage source and produces another form or value of energy, e.g., different voltage and current, over a range of power loads. Closed-loop, analog negative feedback systems generally are optimized for operation over a range of different operating conditions that are at best a compromise and may not be optimal for some or most of the different operating conditions. Therefore, dynamic performance, i.e., transient response, etc., have to be suboptimal because of the limited and fixed choices available in an analog design.

In a general sense, a power converter in a power conversion system can be defined as a device which converters one form of energy into another on a continuous basis. Any storage or loss of energy within such a system while it is performing its conversion function is usually identical to the process of energy translation. There are many types of devices which can provide such a function with varying degrees of cost, reliability, complexity and efficiency.

The mechanisms for power conversion can take many basic forms, such as those which are mechanical, electrical, or chemical processing in nature. The focus herein will be on power converters which perform energy translation electrically and in a dynamic fashion, employing a restricted set of components which include inductors, capacitors, transformers, switches and resistors. How these circuit components are connected is determined by the desired power translation. Resistors introduce undesirable power loss. Since high efficiency is usually an overriding requirement in most applications, resistive circuit elements should be avoided or minimized in a main power control path. Only on rare occasions and for very specific reasons is a power consuming resistance introduced into the main power control path. In auxiliary circuits, such as sequence, monitor and control electronics of the total system, high value resistors are common place, since their loss contributions are usually insignificant.

This focus herein is on the dynamic performance of inductor based, DC to DC switch mode power converters. The dynamic behavior directly determines or influences four important characteristics of a switch-mode power converter: 1) stability of the feedback loop, 2) rejection of input voltage ripple and the closely related transient response to input voltage perturbations, 3) output impedance and the closely related transient response to load perturbations, and 4) compatibility with an input EMI filter.

Due to the complexity of the operation of a switch mode power converter, predicting its dynamic behavior and compensating it over all operating conditions is not always an easy task. Without accurate predictions, and depending only on building the circuit and performing component iterations until the operation is satisfactory, the engineering cost can easily escalate, schedules can be missed, and the final design solution is rarely optimized.

SUMMARY

Therefore a need exists for the ability to dynamically adapt compensation to the operating conditions in a closed-loop, negative feedback system.

According to an embodiment, a switch-mode power supply (SMPS) may comprise: at least one power switch coupled to a voltage source; a power inductor coupled to the at least one power switch; a filter capacitor coupled to a load side of the power inductor that provides a regulated voltage output of the SMPS; at least one driver coupled to the at least one power switch; a pulse width modulation (PWM) generator having at least one output coupled to and controlling the at least one driver, the at least one output of the PWM generator providing at least one PWM signal comprising a plurality of pulses; a digital processor having a memory; a first operational transconductance amplifier (OTA) having a first input coupled to a reference voltage, a second input coupled to the regulated voltage output of the SMPS, and a current input for controlling a transconductance thereof; a first current digital-to-analog converter (IDAC) having an analog output coupled to the current input of the first OTA, a current reference input coupled to a current reference, and digital inputs coupled to the digital processor for controlling a current value from the output thereof; a second operational transconductance amplifier (OTA) having a first input coupled to an output thereof, a second input coupled to a common of the regulated voltage output of the SMPS, and a current input for controlling a transconductance thereof; a second current digital-to-analog converter (IDAC) having an analog output coupled to the current input of the second OTA, a current reference input coupled to the current reference, and digital inputs coupled to the digital processor for controlling a current value from the output thereof; a first capacitor coupled between the outputs of the first and second OTAs; and a second capacitor coupled between the output of the first OTA and the common of the regulated voltage output of the SMPS; wherein the digital processor optimizes analog negative feedback operation of the SMPS by changing the transconductances of the first and second OTAs through the first and second IDACs.

According to a further embodiment, the at least one power switch is at least one power transistor. According to a further embodiment, the at least one power transistor is at least one power metal oxide semiconductor (MOS) field effect transistor (FET). According to a further embodiment, a communications interface is coupled to the digital processor. According to a further embodiment, the digital processor and memory comprise a microcontroller. According to a further embodiment, the digital processor is selected from the group consisting of a microprocessor, a digital signal processor (DSP), a programmable logic array (PLA) and an application specific integrated circuit (ASIC).

According to another embodiment, a switch-mode power supply (SMPS) may comprise: a first power switch coupled to a voltage source; a second power switch coupled between the first power switch and a voltage source return; a power inductor coupled to the first and second power switches; a filter capacitor coupled to a load side of the power inductor that provides a regulated voltage output of the SMPS; a first driver coupled to the first power switch; a second driver coupled to the second power switch; a pulse width modulation (PWM) generator having first and second outputs coupled to and controlling the first and second drivers, respectively, the first and second outputs of the PWM generator providing first and second PWM signals, each comprising a plurality of pulses; a digital processor having a memory; a first operational transconductance amplifier (OTA) having a first input coupled to a reference voltage, a second input coupled to the regulated voltage output of the SMPS, and a current input for controlling a transconductance thereof; a first current digital-to-analog converter (IDAC) having an analog output coupled to the current input of the first OTA, a current reference input coupled to a current reference, and digital inputs coupled to the digital processor for controlling a current value from the output thereof; a second operational transconductance amplifier (OTA) having a first input coupled to an output thereof, a second input coupled to a common of the regulated voltage output of the SMPS, and a current input for controlling a transconductance thereof; a second current digital-to-analog converter (IDAC) having an analog output coupled to the current input of the second OTA, a current reference input coupled to the current reference, and digital inputs coupled to the digital processor for controlling a current value from the output thereof; a first capacitor coupled between the outputs of the first and second OTAs; and a second capacitor coupled between the output of the first OTA and the common of the regulated voltage output of the SMPS; wherein the digital processor optimizes analog negative feedback operation of the SMPS by changing the transconductances of the first and second OTAs through the first and second IDACs.

According to a further embodiment, the first and second power switches are power transistors. According to a further embodiment, the power transistors are power metal oxide semiconductor (MOS) field effect transistors (FETs). According to a further embodiment, a communications interface is coupled to the digital processor. According to a further embodiment, the digital processor and memory comprise a microcontroller. According to a further embodiment, the digital processor is selected from the group consisting of a microprocessor, a digital signal processor (DSP), a programmable logic array (PLA) and an application specific integrated circuit (ASIC).

According to yet another embodiment, a power conversion system using a closed-loop, analog negative feedback circuit having digitally selectable parameters may comprise: a first operational transconductance amplifier (OTA) having a first input coupled to a reference voltage, a second input coupled to an output voltage of the power conversion system, and a current input for controlling a transconductance thereof; a first current digital-to-analog converter (IDAC) having an analog output coupled to the current input of the first OTA, a current reference input coupled to a current reference, and digital inputs coupled to a digital processor for controlling a current value from the output thereof; a second operational transconductance amplifier (OTA) having a first input coupled to an output thereof, a second input coupled to a voltage supply common, and a current input for controlling a transconductance thereof; a second current digital-to-analog converter (IDAC) having an analog output coupled to the current input of the second OTA, a current reference input coupled to the current reference, and digital inputs coupled to the digital processor for controlling a current value from the output thereof; a first capacitor coupled between the outputs of the first and second OTAs; and a second capacitor coupled between the output of the first OTA and the voltage supply common; wherein the digital processor optimizes analog negative feedback operation of the power conversion system by changing the transconductances of the first and second OTAs through the first and second IDACs.

According to a further embodiment of the system, a communications interface is coupled to the digital processor. According to a further embodiment of the system, the digital processor and memory comprise a microcontroller. According to a further embodiment of the system, the digital processor is selected from the group consisting of a microprocessor, a digital signal processor (DSP), a programmable logic array (PLA) and an application specific integrated circuit (ASIC).

According to still another embodiment, a method for power conversion using a closed-loop, analog negative feedback circuit having digitally selectable parameters may comprise the steps of: controlling a transconductance of a first operational transconductance amplifier (OTA) having a first input coupled to a reference voltage, a second input coupled to an output voltage of a power conversion system; controlling a current value of a first current digital-to-analog converter (IDAC) having an analog output coupled to the current input of the first OTA, and a current reference input coupled to a current reference; controlling a transconductance of a second operational transconductance amplifier (OTA) having a first input coupled to an output thereof, a second input coupled to a voltage supply common; controlling a current value of a second current digital-to-analog converter (IDAC) having an analog output coupled to the current input of the second OTA, a current reference input coupled to the current reference; coupling a first capacitor between the outputs of the first and second OTAs; and coupling a second capacitor between the output of the first OTA and the voltage supply common; and optimizing the power conversion system analog negative feedback by changing the transconductances of the first and second OTAs through the first and second IDACs.

According to a further embodiment of the method, the transconductance of the first and second OTAs, and the current values of the first and second IDACs are controlled with a digital processor and a memory. According to a further embodiment of the method, the digital processor and memory comprises a microcontroller. According to a further embodiment of the method, the digital processor is selected from the group consisting of a microprocessor, a digital signal processor (DSP), a programmable logic array (PLA) and an application specific integrated circuit (ASIC).

BRIEF DESCRIPTION OF THE DRAWINGS

A more complete understanding of the present disclosure thereof may be acquired by referring to the following description taken in conjunction with the accompanying drawings wherein.

Figures 1, 2:
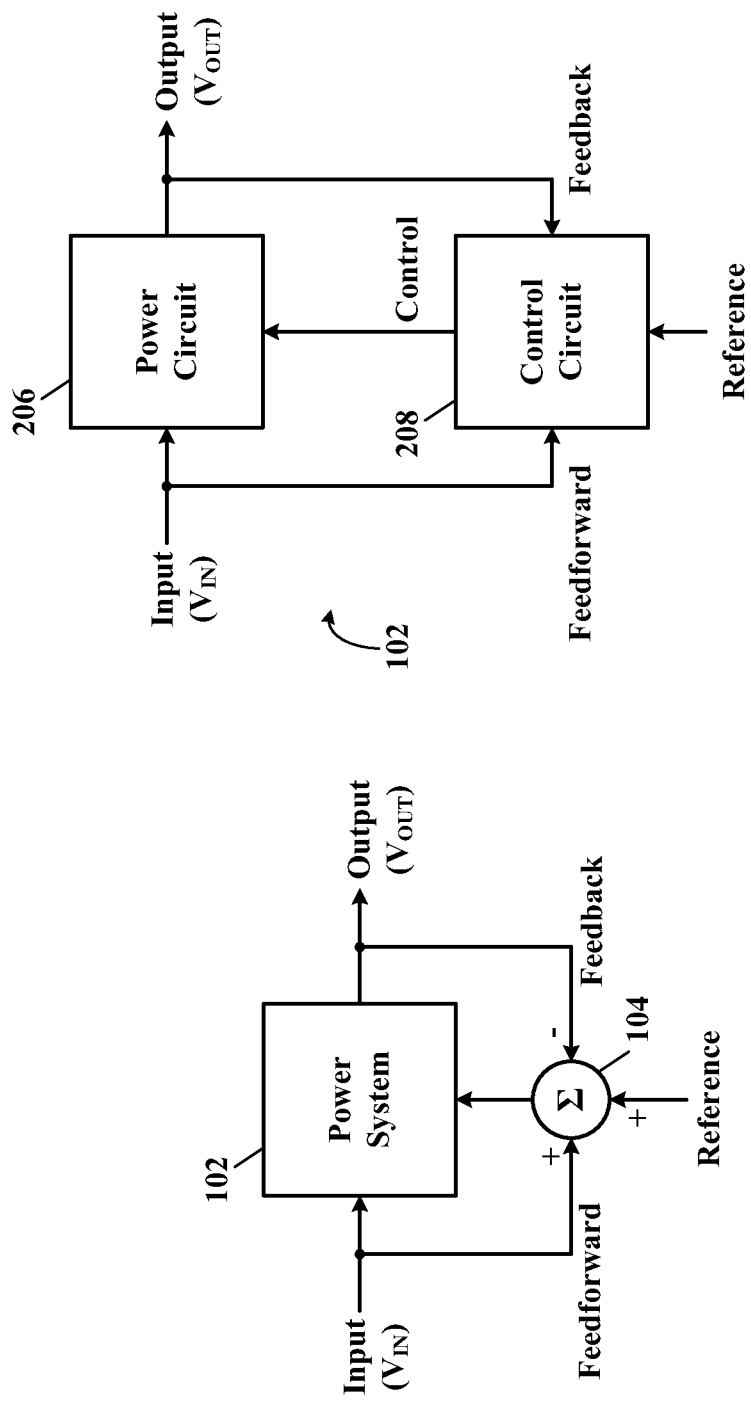
FIG. 1 illustrates a schematic block diagram of a basic voltage regulator system.
FIG. 2 illustrates a more detailed schematic block diagram of the voltage regulator system shown in FIG. 1.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Having the ability to dynamically adapt compensation of a closed-loop, negative feedback system during operation thereof improves dynamic performance. This ability also results in a smaller, highly integrated design with improved reliability and performance. By using a pure analog control loop with digital assist provides the speed and simplicity of an analog design solution combined with the flexibility of a digital design solution, according to the teachings of this disclosure. Adapting the compensation allows the system to accurately predict and adjust, at all DC operating points, (1) the margin of stability of the converter, against closed loop oscillation, and (2) the frequency-domain and time-domain responses to perturbations in the input voltage and/or the output current.

A mixed signal (analog and digital) integrated circuit device may be utilized to implement the analog control loop with digital assist in a closed-loop, negative feedback system. According to the teachings of this disclosure, the compensation in a closed-loop, negative feedback system may be dynamically adapted to different operating conditions, thereby improving the system's dynamic performance over these different operating conditions. This allows improved dynamic performance using a fully integrated design. This is especially advantageous for a robust power supply design, e.g., switch mode power supply (SMPS), having increased reliability and transient response that will easily meet demanding system requirements. In addition, less over-design of the power train components of the power supply results in a smaller, less expensive product.

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of a basic voltage regulator system. A power system 102, e.g., a basic switch-mode power converter where an input of an uncontrolled source of voltage (or current, or power) is applied to the input of the power system 102 with the expectation that the voltage (or current, or power) at the output will be very well controlled. The basis of controlling the output is to compare it to some form of reference, and any deviation between the output and the reference becomes an error. In a feedback-controlled system, negative feedback is used to reduce this error to an acceptable value, as close to zero as is required by the system. It is desirable, typically, to reduce the error quickly, but inherent with feedback control is the trade-off between system response and system stability. The more responsive the feedback network is, the greater becomes the risk of instability.

At this point, it should be mentioned that there is another method of control—feed forward. With feed forward control, a control signal is developed directly in response to an input variation or perturbation. Feed forward is less accurate than feedback since output sensing is not involved, however, there is no delay waiting for an output error signal to be developed, and feed forward control cannot cause instability. It should be clear that feed forward control typically is not adequate as the only control method for a voltage regulator, but it is often used together with feedback to improve a regulator's response to dynamic input variations.

Referring to FIG. 2, depicted is a more detailed schematic block diagram of the voltage regulator system shown in FIG. 1. The power system 102 has been separated into two blocks: 1) the power circuit 206, and 2) the control circuit 208. The power circuit 206 handles the power system load current and is typically large, robust, and subject to wide temperature fluctuations. Its switching functions are by definition, large-signal phenomenon, normally simulated in most stability analyses as just a two-state switch with a duty cycle. The output filter (not shown) is also considered as a part of the power circuit 206, but can be considered as a linear block. The control circuit 208 will normally be made up of a gain block, an error amplifier, and a pulse-width modulator, used to define the duty cycle for the power switches. According to the teachings of this disclosure, the control circuit 208 is optimized to respond to disturbances in the power system 102 while maintaining a desired output voltage, $V_{OUT}$.

Figure 3:
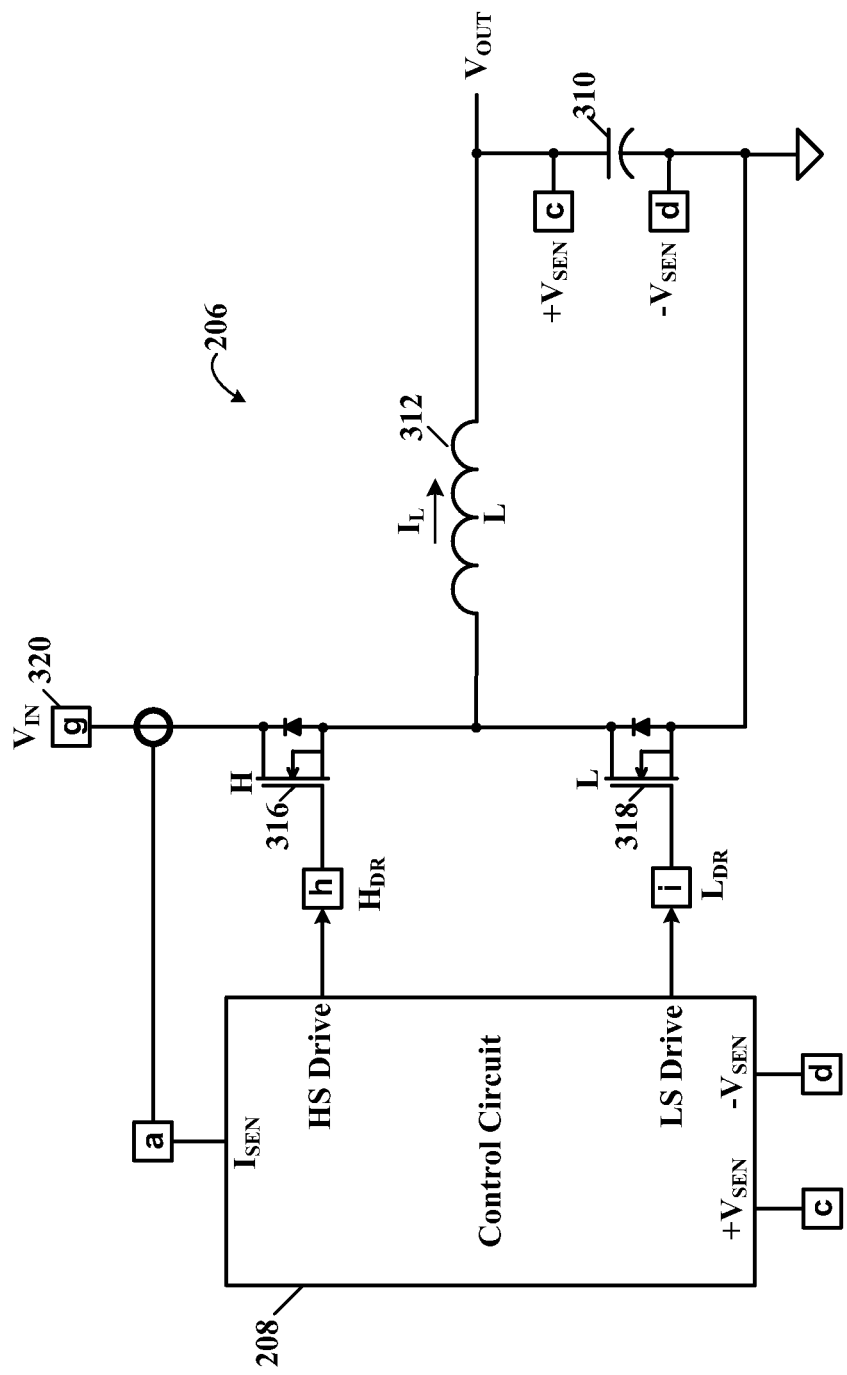
FIG. 3 illustrates a schematic diagram of the circuits shown in FIG. 2 implemented as a synchronous buck switch-mode power supply (SMPS)

Referring to FIG. 3, depicted is a schematic diagram of the circuits shown in FIG. 2 implemented as a synchronous buck switch-mode power supply (SMPS), according to a specific example embodiment of this disclosure. The power circuit 206 of the SMPS receives power (voltage and current) from a power source 320, e.g., battery, and comprises a power inductor 312, high and low power switches 316 and 318, respectively, e.g., power field effect transistors; and a load capacitor 310 for smoothing alternating current (AC) ripple from the desired direct current (DC) output. The power circuit 206 is connected to and is controlled by the control circuit 208 as more fully described hereinafter.

The transfer function for the synchronous buck converter employing peak current mode control with slope compensation can be derived as:

$$T(s) = \frac{K_{FB} K_{EA}(s) \left(\frac{\gamma 2 f_s}{(1-D)}\right)\left(\frac{1}{R_S C}\right)}{\left(s + \frac{\gamma 2 f_s}{(1-D)}\right)\left(s + \frac{1}{RC}\right)}$$

Wherein $K_{FB}$ is the voltage feedback gain, and $\gamma$ is the gain factor attributed to the slope compensation ramp. This added ramp also has the effect of reducing the gain of both the voltage and current loops, whereby $f_S$ is the converter switching frequency, D is the duty cycle, and $R_S$ is the effective current sense resistance, e.g., the current to voltage gain. C is the output capacitance, R is the output load, and s is the Laplace transformation from the time domain to the frequency domain. $K_{EA}(s)$ is the error amplifier transfer function in the frequency domain.

The transfer function has a dominant low frequency pole at:

$$\omega = \frac{1}{RC}$$

and another higher frequency pole at:

$$\omega = \frac{\gamma 2 f_S}{(1-D)} \gg \frac{1}{\sqrt{LC}}$$

The system is essentially first order, and the gain factor attributed to the slope compensation ramp is:

$$\gamma = \frac{m_1}{m_1 + 2m_3}$$

Wherein $m_1$ is the inductor current up-slope:

$$m_1 = \frac{(E-U)R_S}{L}$$

$m_2$ is the inductor current down-slope:

$$m_2 = -\frac{UR_S}{L}$$

and $m_3$ is the added stabilizing ramp. It can be seen that the gain block associated with the input voltage goes to zero for:

$$\gamma = (1-D)$$

which corresponds, theoretically, to zero audio susceptibility. This implies an "optimum" slope compensation ramp of:

$$m_3 = \left(\frac{U}{L}\right)\left(\frac{R_S}{2}\right)$$

which is independent of D and is greater than the minimum requirement previously discussed. If the assumption is made to apply this optimum amount of slope compensation, then the transfer function reduces to:

$$\text{for all } T(s) = \frac{K_{FB} K_{EA}(s)\left(\frac{1}{R_S C}\right)}{\left(s + \frac{1}{RC}\right)}$$

$$f \ll \frac{f_S}{\pi}$$

Adaptive Compensation

As shown by the transfer function, the system is essential first order with a dominant pole determined by the output capacitor and output load. The gain is influenced by the effective current sense resistance and the feedback gain. Therefore, optimal compensation varies with the operating conditions. The following terms are defined for the stability analysis hereinafter:

Gain Margin is the difference between unity gain (zero dB) and the actual gain when the phase reaches 180. The preferred value is −6 dB to −12 dB.

Phase Margin is the difference between 180 and the actual phase when the gain reaches unity gain. The preferred value is 45 to 60.

Stability Criteria is a commonly used derivative from the above two definitions is that if the slope of the gain response as it crosses the unity-gain axis is not more than −6 dB/octave, the phase margin will be greater than 45 and the system will be stable.

Figure 4:
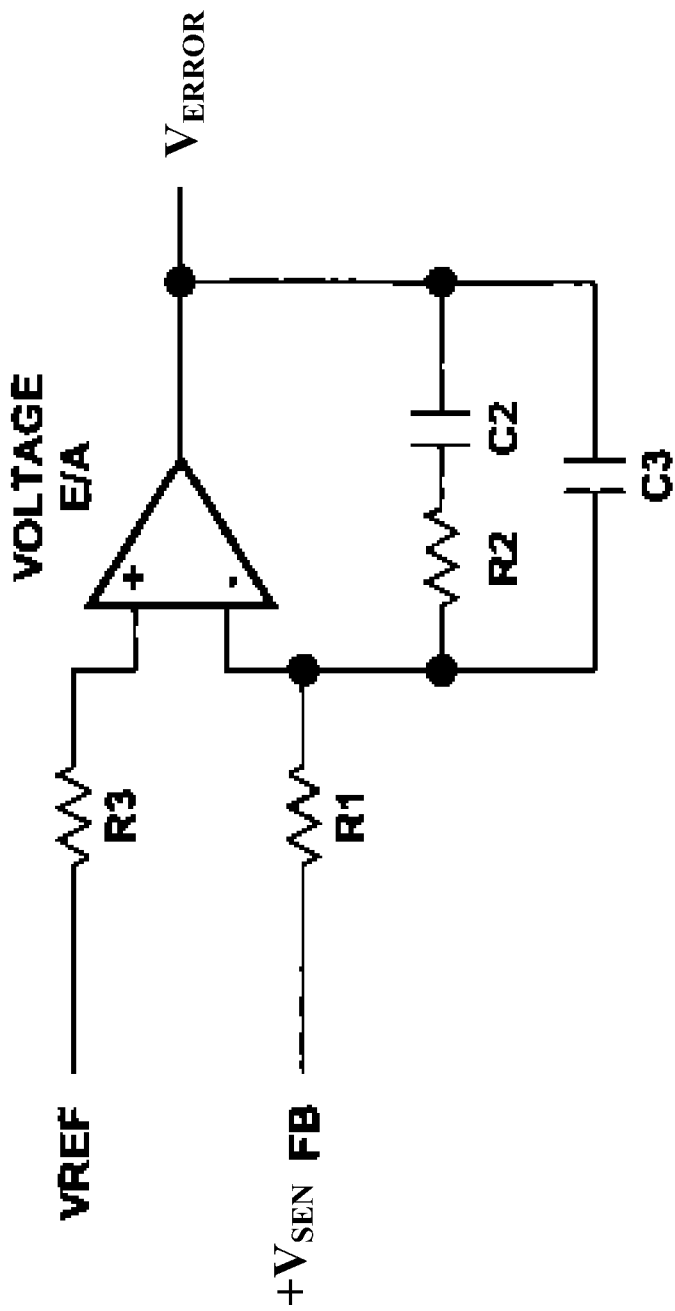
FIG. 4 illustrates a schematic diagram of prior art compensation for an error amplifier in an analog control loop.

Referring to FIG. 4, depicted is a schematic diagram of prior art compensation for an error amplifier in an analog control loop. The transfer function for this error amplifier is:

$$K_{EA}(s) = \frac{1 + sR_2 C_2}{sR_1(C_2 + C_3)\left(1 + R_2 \frac{C_2 C_3}{C_2 + C_3}\right)}$$

Figure 5:
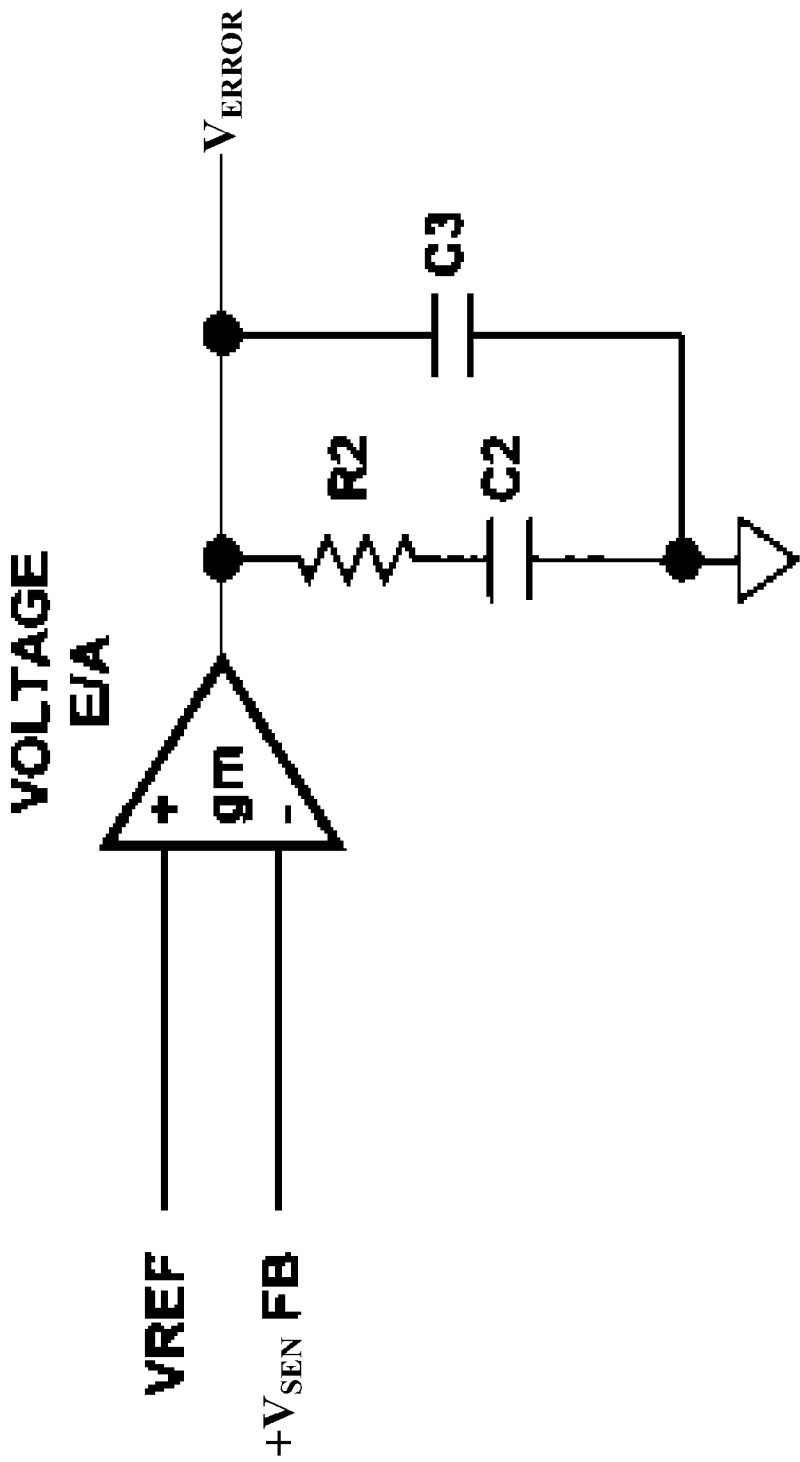
FIG. 5 illustrates a schematic diagram of another prior art compensation for an error amplifier in an analog control loop.

Referring to FIG. 5, depicted is a schematic diagram of another prior art compensation for an error amplifier in an analog control loop. The transfer function for this error amplifier is:

$$K_{EA}(s) = \frac{1 + sR_2 C_2}{s\frac{(C_2 + C_3)}{gm}\left(1 + R_2 \frac{C_2 C_3}{C_2 + C_3}\right)}$$

FIGS. 4 and 5 depict fixed compensation for an error amplifier in an analog control loop. The compensation can not adapt to different operating conditions. According to the teachings of this disclosure, compensation is adapted to different operating conditions in order to provide optimal stability and dynamic performance.

Figure 6:
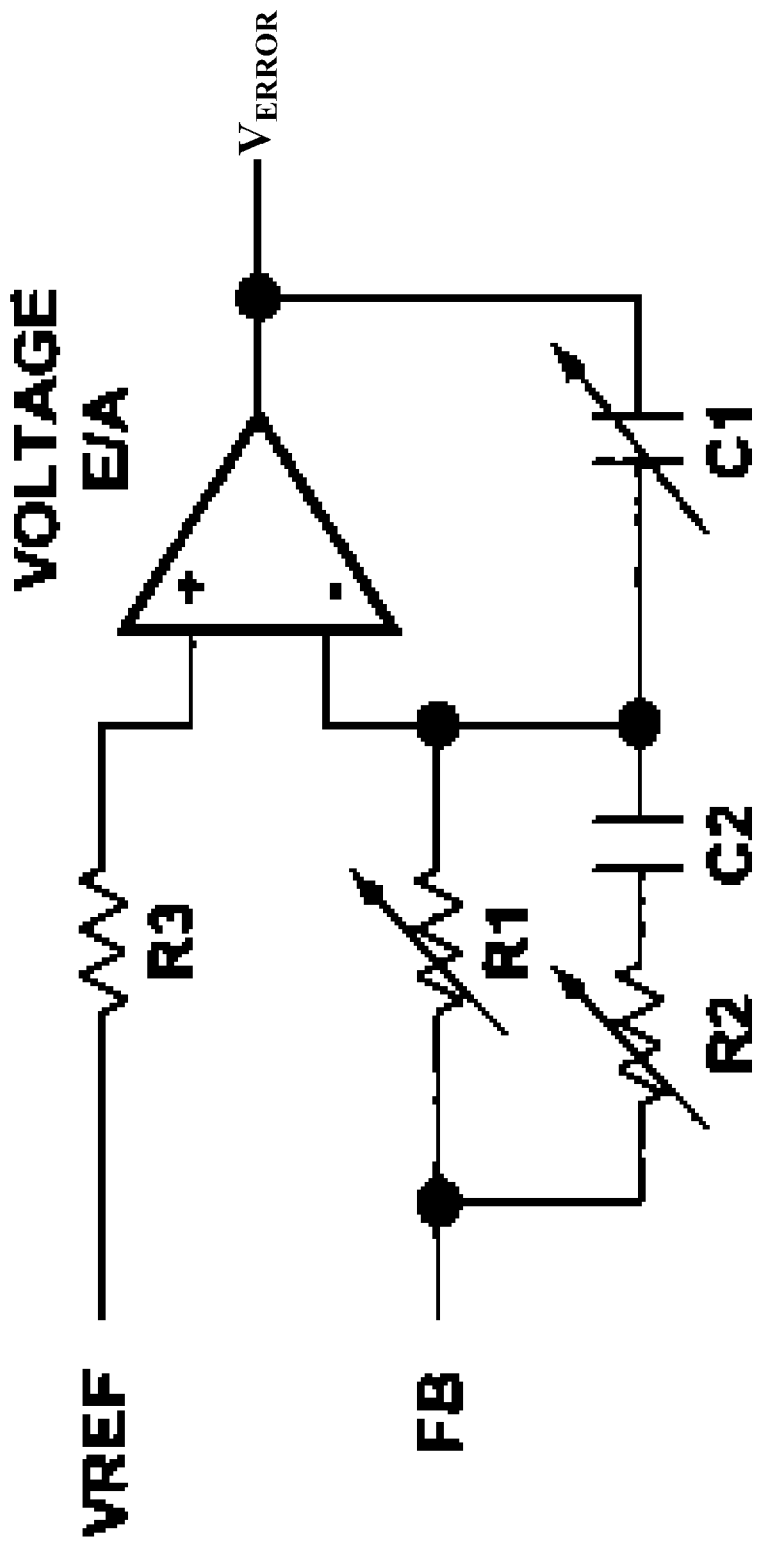
FIG. 6 illustrates a schematic diagram of an adaptive analog control loop error amplifier, according to the teachings of this disclosure.

Referring to FIG. 6, depicted is a schematic diagram of an adaptive analog compensation circuit for a synchronous buck converter, according to the teachings this disclosure. The transfer function of the proportional-integral compensation shown in FIG. 6 is:

$$K_{EA}(s) = \frac{1 + s(R_1 + R_2)C_2}{sR_1 C_1(1 + sR_2 C_2)}$$

According to the teachings of this disclosure, an adaptive compensation procedure to meet the gain margin, phase margin, and stability criteria defined herein is as follows:

For gain adjust $C_1$ $$K = \frac{C_2}{C_1} = 2F_S R_S C$$

wherein unity gain is at:

$$F = F_C = \frac{F_S}{\pi}$$

For zero adjust $R_1$ $$F_Z = \frac{1}{2\pi(R_1+R_2)C_2} = \frac{1}{2\pi RC}$$

The zero is placed on top of the dominant pole determined by the output capacitor and output load. The zero provides increased low-frequency gain and "zero" DC error. The zero may be adapted for different operating conditions.

For pole adjust $R_2$ $$F_P = \frac{1}{2\pi(R_2)C_2} = \frac{1}{2\pi(C_{ESR})C}$$

The pole is placed on top of the zero determined by the output capacitor and output capacitor equivalent series resistance, ESR. The pole cancels the lead effect of the ESR. In this manner, the dynamic compensation adapts to operating conditions of the power conversion circuit.

Figure 7:
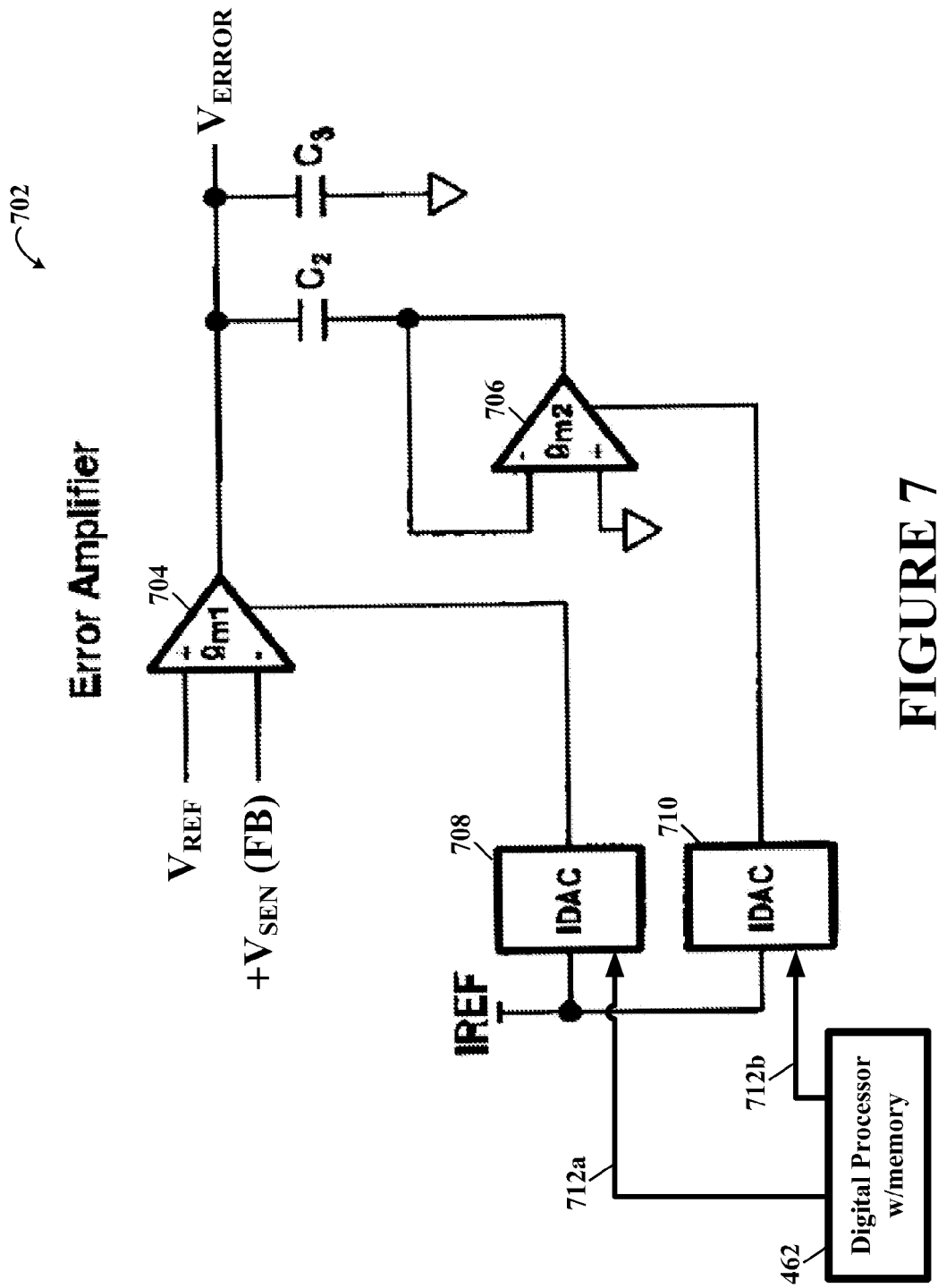
FIG. 7 illustrates a schematic diagram of the adaptive analog control loop error amplifier, according to a specific example embodiment of this disclosure.

Referring to FIG. 7, depicted is a schematic diagram of the adaptive analog control loop error amplifier, according to a specific example embodiment of this disclosure. The error amplifier 702 comprises a first operational transconductance amplifier (OTA) 704, a second OTA 706, a first current digital-to-analog converter (IDAC) 708 and second IDAC 710. Capacitors $C_2$ and $C_3$ are included but are not controllable. The transconductance of the first OTA 704 is controlled with a constant current output from the first IDAC 708. The analog current output of the first IDAC 708 is controlled by a digital processor with memory 462 (FIG. 8) through digital inputs of the first IDAC 708 that are coupled to digital outputs of the digital processor 462. The transconductance of the second OTA 706 is controlled with a constant current output from the second IDAC 710. The analog current output of the second IDAC 710 is controlled by the digital processor with memory 462 (FIG. 8) through digital inputs of the second IDAC 710 that are coupled to digital outputs of the digital processor 462. The first and second OTAs 704 and 706 each comprise differential voltage inputs, a current output, and a current input for controlling the transconductance thereof. The IDACs 708 and 710 are also coupled to a current reference, $I_{REF}$. The digital processor may be for example, but is not limited to, a microcontroller, a microprocessor, a digital signal processor (DSP), a programmable logic array (PLA), an application specific integrated circuit (ASIC), etc.

The first OTA 704 and the first IDAC 708 control the gain of the error amplifier 702. The second OTA 706 and the second IDAC 710 control the placement of the zero of the error amplifier 702. System gain margin and phase margin can be adapted for varying operating conditions. In this way, the digital processor 462 may control the gain margin, phase margin and stability of the closed loop system, according to the teachings of this disclosure.

Figure 8:
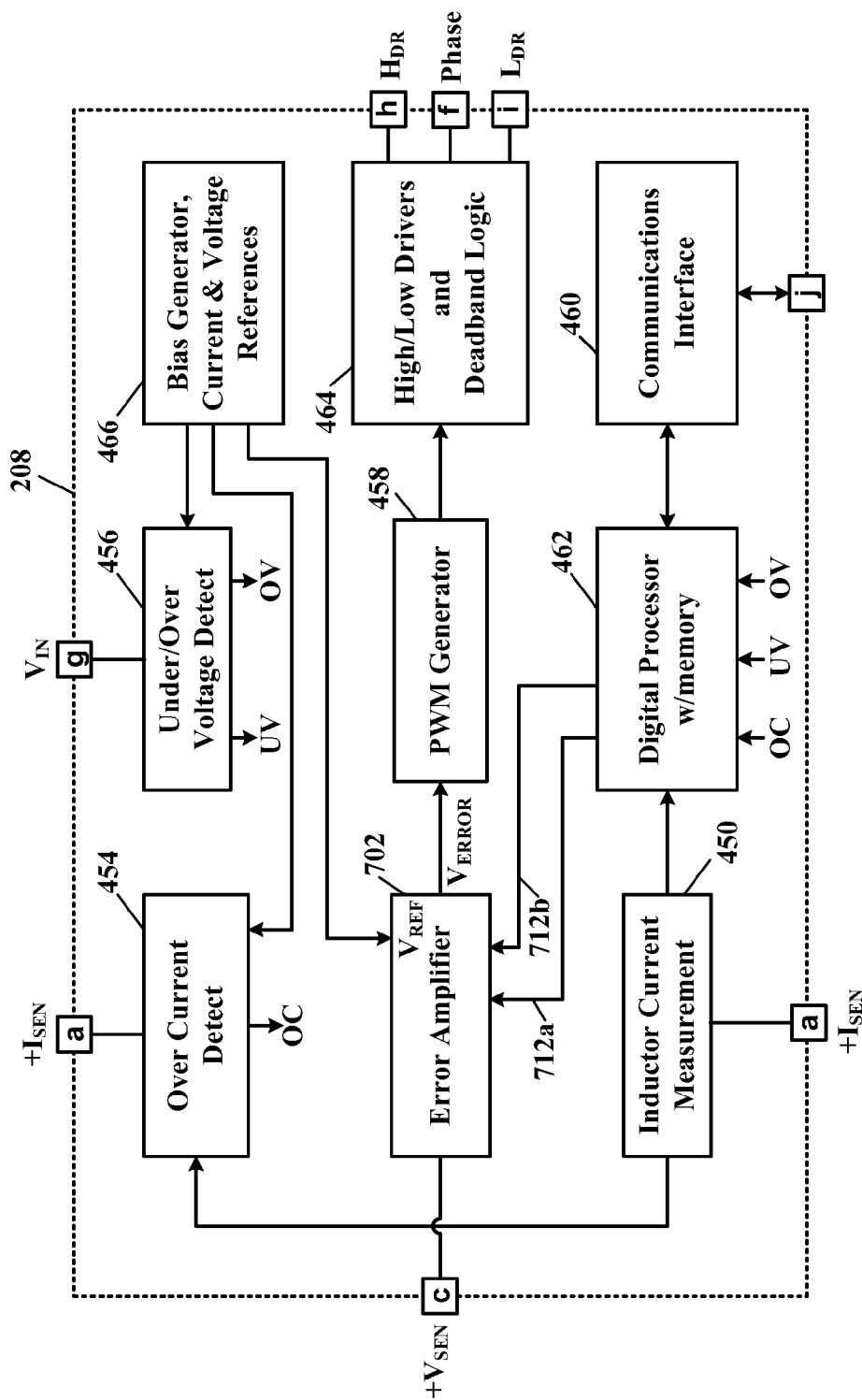
FIG. 8 illustrates a schematic block diagram of a control circuit utilizing the adaptive analog control loop error amplifier of FIG. 7, according to the specific example embodiment of this disclosure.

FIG. 8 illustrates a schematic block diagram of a control circuit utilizing the adaptive analog control loop error amplifier of FIG. 7, according to the specific example embodiment of this disclosure. The control circuit 208 is connected to the power circuit 206 shown in FIG. 3 and may comprise a digital processor with memory 462, e.g., microcontroller; high and low switch drivers having dead band logic represented by function block 464, bias generator, current and voltage reference circuits 466; under and over voltage detectors 456, a PWM generator 458, an over current detector 454, the error amplifier 702 shown in FIG. 7, a power inductor current measurement circuit 450 and, optionally, a communications interface 460. The communications interface 460 may be coupled to the digital processor with memory 462 and used to monitor operation and/or change parameters thereof.

The high and low switch drivers of the function block 464 are coupled to and control when the high and low switches 316 and 318 turn on and off. In addition the dead band logic of the function block 464 prevents the high and low switches 316 and 318 from ever being on at the same time, preferably, there is a dead band where both of the high and low switches 316 and 318 are off. The PWM generator 458 controls when and for how long the power inductor 312 is coupled to and is being charged from the power source 320.

The error amplifier 702 measures the output voltage, +Vs-ens, and compares it to a reference voltage, $V_{REF}$, from the voltage reference circuit 466. An error signal from the error amplifier 702, representing the difference between a desired voltage (Vref) and the actual SMPS output voltage, is applied to an error input of the PWM generator 458, wherein the PWM generator 458 adjusts its pulse waveform output to minimize that difference (closed loop feedback, see FIGS. 1-3). The over current detector 454 monitors the current to the power inductor 312, and the under and over voltage detectors 456 monitor the input voltage to the SMPS for undesirable e.g., abnormal, conditions, e.g., inductor current exceeds allowable design limits, input voltage is above or below a design operating input voltage range. The power inductor current measurement circuit 450 measures SMPS power inductor current. It is contemplated and within the scope of this disclosure that any method and/or circuit for measuring current through the power inductor 312 may be used, and one having ordinary skill in the design of SMPS systems and having the benefit of this disclosure would understand how to implement such a current measurement circuit. Various inductor current measurement circuits are more fully described in commonly owned U.S. patent application Ser. No. 12/959,837, by Scott Dearborn, filed Dec. 3, 2010, and is incorporated by reference herein for all purposes.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A switch-mode power supply (SMPS), comprising:
   at least one power switch coupled to a voltage source;
   a power inductor coupled to the at least one power switch;
   a filter capacitor coupled to a load side of the power inductor that provides a regulated voltage output of the SMPS;
   at least one driver coupled to the at least one power switch;
   a pulse width modulation (PWM) generator having at least one output coupled to and controlling the at least one driver, the at least one output of the PWM generator providing at least one PWM signal comprising a plurality of pulses;
   a digital processor having a memory;
   a first operational transconductance amplifier (OTA) having a first input coupled to a reference voltage, a second input coupled to the regulated voltage output of the SMPS, and a current input for controlling a transconductance thereof;

a first current digital-to-analog converter (IDAC) having an analog output coupled to the current input of the first OTA, a current reference input coupled to a current reference, and digital inputs coupled to the digital processor for controlling a current value from the output thereof;

a second operational transconductance amplifier (OTA) having a first input coupled to an output thereof, a second input coupled to a common of the regulated voltage output of the SMPS, and a current input for controlling a transconductance thereof;

a second current digital-to-analog converter (IDAC) having an analog output coupled to the current input of the second OTA, a current reference input coupled to the current reference, and digital inputs coupled to the digital processor for controlling a current value from the output thereof;

a first capacitor connected between the outputs of the first and second OTAs; and a second capacitor connected between the output of the first OTA and the common of the regulated voltage output of the SMPS;

wherein the digital processor optimizes analog negative feedback operation of the SMPS by changing the transconductances of the first and second OTAs through the first and second IDACs.

2. The SMPS according to claim 1, wherein the at least one power switch is at least one power transistor.

3. The SMPS according to claim 2, wherein the at least one power transistor is at least one power metal oxide semiconductor (MOS) field effect transistor (FET).

4. The SMPS according to claim 1, further comprising a communications interface coupled to the digital processor.

5. The SMPS according to claim 1, wherein the digital processor and memory comprise a microcontroller.

6. The SMPS according to claim 1, wherein the digital processor is selected from the group consisting of a microprocessor, a digital signal processor (DSP), a programmable logic array (PLA) and an application specific integrated circuit (ASIC).

7. A switch-mode power supply (SMPS), comprising:
a first power switch coupled to a voltage source;
a second power switch coupled between the first power switch and a voltage source return;
a power inductor coupled to the first and second power switches;
a filter capacitor coupled to a load side of the power inductor that provides a regulated voltage output of the SMPS;
a first driver coupled to the first power switch;
a second driver coupled to the second power switch;
a pulse width modulation (PWM) generator having first and second outputs coupled to and controlling the first and second drivers, respectively, the first and second outputs of the PWM generator providing first and second PWM signals, each comprising a plurality of pulses;
a digital processor having a memory;
a first operational transconductance amplifier (OTA) having a first input coupled to a reference voltage, a second input coupled to the regulated voltage output of the SMPS, and a current input for controlling a transconductance thereof;
a first current digital-to-analog converter (IDAC) having an analog output coupled to the current input of the first OTA, a current reference input coupled to a current reference, and digital inputs coupled to the digital processor for controlling a current value from the output thereof;

a second operational transconductance amplifier (OTA) having a first input coupled to an output thereof, a second input coupled to a common of the regulated voltage output of the SMPS, and a current input for controlling a transconductance thereof;

a second current digital-to-analog converter (IDAC) having an analog output coupled to the current input of the second OTA, a current reference input coupled to the current reference, and digital inputs coupled to the digital processor for controlling a current value from the output thereof;

a first capacitor connected between the outputs of the first and second OTAs; and a second capacitor connected between the output of the first OTA and the common of the regulated voltage output of the SMPS;

wherein the digital processor optimizes analog negative feedback operation of the SMPS by changing the transconductances of the first and second OTAs through the first and second IDACs.

8. The SMPS according to claim 7, wherein the first and second power switches are power transistors.

9. The SMPS according to claim 8, wherein the power transistors are power metal oxide semiconductor (MOS) field effect transistors (FETs).

10. The SMPS according to claim 7, further comprising a communications interface coupled to the digital processor.

11. The SMPS according to claim 7, wherein the digital processor and memory comprise a microcontroller.

12. The SNIPS according to claim 7, wherein the digital processor is selected from the group consisting of a microprocessor, a digital signal processor (DSP), a programmable logic array (PLA) and an application specific integrated circuit (ASIC).

13. A power conversion system using a dosed-loop, analog negative feedback circuit having digitally selectable parameters, said system comprising:
a digital processor having a memory;
a first operational transconductance amplifier (OTA) having a first input coupled to a reference voltage, a second input coupled to an output voltage of the power conversion system, and a current input for controlling a transcoaductance thereof;
a first current digital-to-analog convener (IDAC) having an analog output coupled to the current input of the first OTA, a current reference input coupled to a current reference, and digital inputs coupled to the digital processor for controlling a current value from the output thereof;
a second operational transconductance amplifier (OTA) having a first input coupled to an output thereof, a second input coupled to a voltage supply common, and a current input for controlling a transconductance thereof;
a second current digital-to-analog convener (MAC) having an analog output coupled to the current input of the second OTA, a current reference input coupled to the current reference, and digital inputs coupled to the digital processor for controiling a current value from the output thereof;
a first capacitor connected between the outputs of the first and second OTAs; and
a second capacitor connected between the output of the first OTA and the voltage supply common;
wherein the digital processor optimizes analog negative feedback operation of the power conversion system by changing the transconductances of the first and second OTAs through the first and second IDACs.

14. The power conversion system according to claim 13, further comprising a communications interface coupled to the digital processor.

15. The power conversion system according to claim 13, wherein the digital processor and memory comprise a microcontroller.

16. The power conversion system according to claim 13, wherein the digital processor is selected from the group consisting of a microprocessor, a digital signal processor (DSP), a programmable logic array (PLA) and an application specific integrated circuit (ASIC).

17. A method for power conversion using a closed-loop, analog negative feedback circuit having digitally selectable parameters, said method comprising the steps of:

controlling a transconductance of a first operational transconductance amplifier (OTA) having a first input coupled to a reference voltage, a second input coupled to an output voltage of a power conversion system;

controlling a current value of a first current digital-to-analog converter (IDAC) having an analog output coupled to the current input of the first OTA, and a current reference input coupled to a current reference;

controlling a transconductance of a second operational transconductance amplifier (OTA) having a first input coupled to an output thereof, a second input coupled to a voltage supply common;

controlling a current value of a second current digital-to-analog converter (MAC) having an analog output coupled to the current input of the second OTA, a current reference input coupled to the current reference;

connecting a first capacitor between the outputs of the first and second OTAs; and connecting a second capacitor between the output of the first OTA and the voltage supply common; and optimizing the power conversion system analog negative feedback by changing the transconductances of the first and second OTAs through the first and second IDACs.

18. The method according to claim 17, further comprising the steps of controlling the transconductance of the first and second OTAs, and the current values of the first and second IDACs with a digital processor and a memory.

19. The method according to claim 18, wherein the digital processor and memory comprises a microcontroller.

20. The method according to claim 18, wherein the digital processor is selected from the group consisting of a microprocessor, a digital signal processor (DSP), a programmable logic array (PLA) and an application specific integrated circuit (ASIC).

\* \* \* \* \*

UNITED STATES PATENT AND TRADEMARK OFFICE
CERTIFICATE OF CORRECTION

PATENT NO. : 8,922,183 B2
APPLICATION NO. : 13/325805
DATED : December 30, 2014
INVENTOR(S) : Scott Dearborn et al.

It is certified that error appears in the above-identified patent and that said Letters Patent is hereby corrected as shown below:

In the Claims

Column 12,
Claim 12, line 30, "The SNIPS according to claim 7, wherein the digital…" ---Change to--- "The SMPS according to claim 7, wherein the digital…"

Column 12,
Claim 13, line 43, "…transcoaductance thereof;…" ---Change to--- "…transconductance thereof;…"

Column 12,
Claim 13, line 54, "…a second current digital-to-analog convener (MAC) having…" ---Change to--- "…a second current digital-to-analog converter (IDAC) having…"

Signed and Sealed this
Twenty-first Day of April, 2015

Michelle K. Lee
*Director of the United States Patent and Trademark Office*